Dec. 18, 1956  V. S. DANIELSON  2,774,485
RUBBER SHOCK ABSORBING MECHANISMS
FOR RAILWAY CAR DRAFT RIGGINGS
Filed May 13, 1954  2 Sheets-Sheet 1
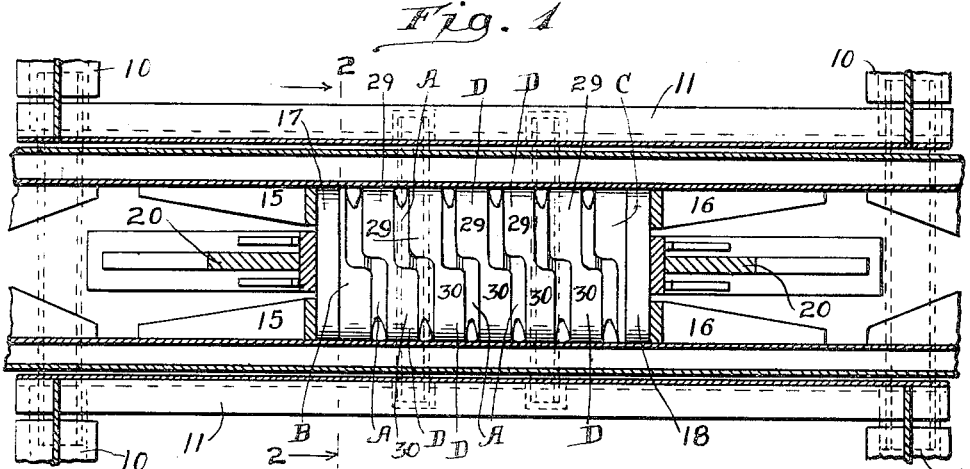
Fig. 1
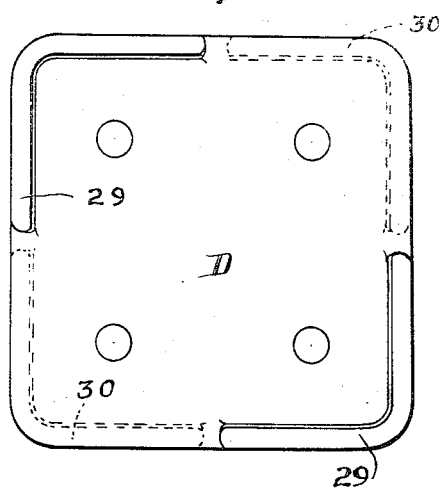
Fig. 6
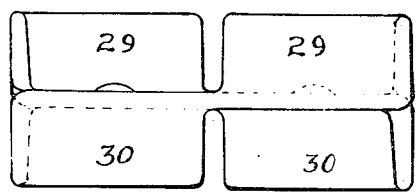
Fig. 7
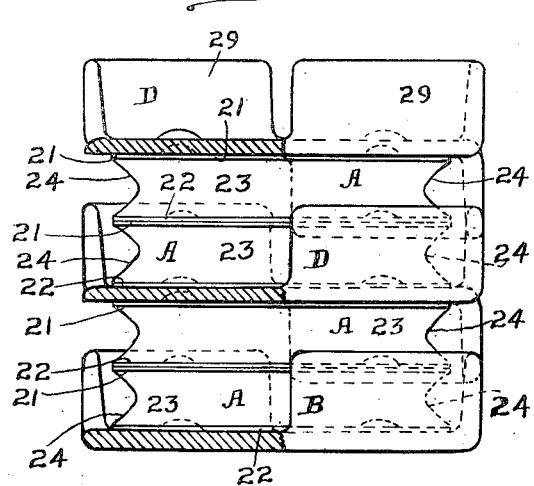
Fig. 8
Fig. 9
Inventor:
Vernon S. Danielson
By Henry Fuchs
Atty Dec. 18, 1956 V. S. DANIELSON 2,774,485
RUBBER SHOCK ABSORBING MECHANISMS
FOR RAILWAY CAR DRAFT RIGGINGS
Filed May 13, 1954 2 Sheets-Sheet 2
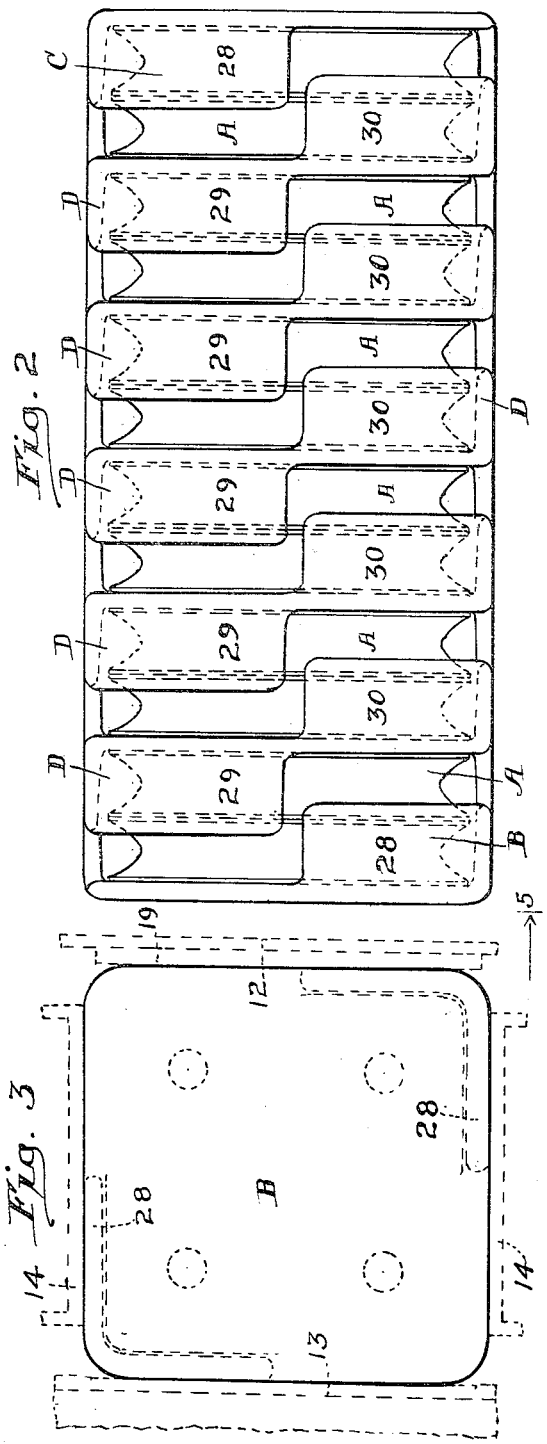
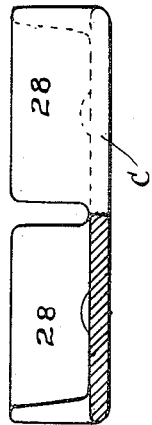
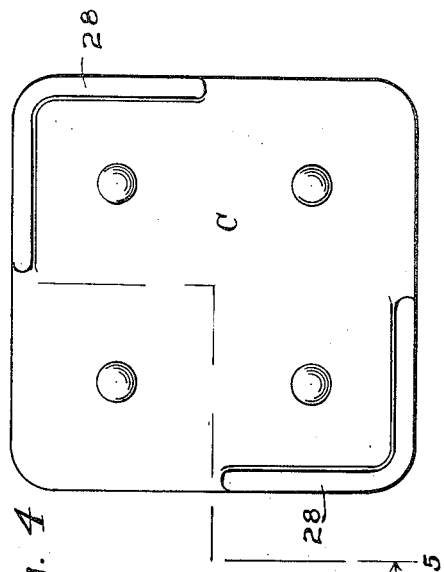
Inventor:
Vernon S. Danielson,
By Henry Fuchs
Atty.

United States Patent Office 2,774,485
Patented Dec. 18, 1956

2,774,485
RUBBER SHOCK ABSORBING MECHANISMS FOR RAILWAY CAR DRAFT RIGGINGS

Vernon S. Danielson, Chicago, Ill., assignor to W. H. Miner, Inc., Chicago, Ill., a corporation of Delaware Application May 13, 1954, Serial No. 429,604

4 Claims. (Cl. 213—45)

This invention relates to improvements in rubber shock absorbing mechanisms for railway car draft riggings.

One object of the invention is to provide a high capacity rubber shock absorbing mechanism particularly adapted for use in connection with railway cars provided with lengthwise movable draft sills.

Another object of the invention is to provide a shock absorbing mechanism of the character indicated comprising a column of rubber shock absorbing units and spacing follower plates, wherein the follower plates are provided with flanges which overhang the units to prevent edgewise displacement of the same and buckling of the column, wherein the flanges of adjacent plates are interspaced and overlap to provide maximum width for guiding purposes to stabilize the column.

A still further object of the invention is to provide a shock absorbing mechanism comprising a column of rubber cushioning units, each composed of a pair of metal plates and an interposed rubber pad or mat vulcanized and bonded to the plates, wherein the column of units is stabilized against buckling by a plurality of centering or aligning followers which divide the column of units into spaced groups, the aligning followers being held against displacement in edgewise direction by being guided between the usual top and bottom members of the underframe structure of the car body and by being embraced between the movable draft sills of the draft rigging, the spacing follower plates being provided with peripheral flanges which present bearing faces affording extended contact lengthwise of the mechanism with the guide means presented by the underframe structure and movable sills of the car.

Other objects of the invention will more clearly appear from the description and claims hereinafter following.

In the accompanying drawings forming a part of this specification, Figure 1 is a horizontal, longitudinal sectional view through the underframe structure of a railway car, illustrating my improved rubber shock absorbing mechanism in connection therewith, the latter being shown in plan.

Figure 2 is a plan view, on an enlarged scale, of the rubber shock absorbing mechanism illustrated in Figure 1.

Figure 3 is an elevational view of Figure 2, looking from left to right, indicating the underframe and movable draft sills in dotted lines.

Figure 4 is an elevational view of the follower plate at the right hand end of Figure 2, looking from left to right in said figure.

Figure 5 is a part elevational and part transverse sectional view, corresponding substantially to the line 5—5 of Figure 4.

Figure 6 is a plan view of one of the spacing follower plates, of my improved mechanism, shown in Figure 8.

Figure 7 is a side elevational view of Figure 6, looking upwardly in said figure.

Figure 8 is a sectional view similar to Figure 5, but showing in addition the two groups of rubber cushioning units and the associated spacing followers, at the left hand end of Figure 2.

Figure 9 is a transverse sectional view, broken away, of one of the rubber mats, and the associated spacing follower plate, together with the metal plates adjacent said follower plate, illustrated in separated condition.

In said drawings, 10—10 indicate the cross bearers of the underframe of a railway car, 11—11 the longitudinally extending fixed center or draft sills of said car, and 12 the car floor structure. A supporting plate 13 extending lengthwise of the car underframe from one cross bearer to the other forms the bottom wall of the draft gear pocket, which is defined by the same, the car floor 12, and the fixed sills 11—11. Slidable lengthwise of the car, between the fixed sills, are the movable center sills 14—14, in the form of lengthwise extending, channel-shaped beams. The movable sills 14—14 extend from end to end of the car and have the usual couplers, not shown, connected thereto. The sills 14—14 are also provided with transversely aligned pairs of stop lugs 15—15 and 16—16 on the inner sides thereof, the lugs 15 and 16 of each sill being spaced apart lengthwise of said sill to an extent to accommodate my improved shock absorbing mechanism and the usual pair of follower blocks 17 and 18 therebetween. A lengthwise extending wear plate 19, extending from one cross bearer to the other is preferably secured to the underneath side of the floor structure 12 to serve as a top guide for my improved shock absorbing mechanism. Longitudinally spaced fixed end stops 20—20 are provided within the draft gear pocket of the underframe of the car, the same being rigidly secured to the car structure and located in the spaces between the stop lugs 15—15 and 16—16. The longitudinal spacing of the stops 20—20 is the same as the spacing between the lugs 15 and 16 so that the follower blocks 17 and 18 normally abut both stops and lugs.

My improved rubber shock absorbing mechanism, as illustrated, comprises broadly a plurality of rubber cushioning units A—A, end follower plates B and C, and a plurality of spacing follower plates D—D—D—D—D, together forming a resilient yielding column.

As shown in Figure 1, my improved mechanism as applied to the car is arranged within the draft gear pocket of the underframe between the follower blocks 17 and 18.

The rubber cushioning units A of my improved mechanism are all of the same design, each unit comprising a pair of substantially square metal plates 21 and 22 and an interposed flat rubber pad or mat 23 which is vulcanized and bonded to the inner sides of the plates. The rubber pad 23 of each unit A corresponds in surface area and outline to the plates 21 and 22 and has the peripheral edge faces thereof indented or grooved, as indicated at 24, to accommodate the flow of the material of the pad, as the same is compressed, thereby preventing the material of the pad from being squeezed outwardly to an extent to bulge beyond the edges of the plates 21 and 22 and be thus subjected to the danger of being damaged. The plates 21 and 22 have hollow centering bosses 25—25 thereon. The interposed rubber pad 23 of each unit A has centering projections 26 on one side engaged in the hollow of the bosses 25 of the plate 21 at the corresponding side of the unit and indentations or seats 27 at the opposite side engaged by the protrusions of the hollow bosses 25 of the other plate of said unit.

As shown in Figures 1 and 2, the resilient column of my improved mechanism comprises a plurality of units A—A which are arranged in groups, separated by the spacing follower plates D—D, the groups being six in number and each group comprising a set of two units' A—A. The two units of each set are held in aligned condition by having the hollow centering bosses 25 of the plates 21 and 22 of adjacent units engaged with each other. As illustrated in Figures 1 and 2, the follower plate B bears on the group of units A—A at the left hand end of the column, the follower plate C on the units at the right hand end of the column, and the spacing follower plates are alternated with the groups of units. As shown, the spacing follower plates D are five in number.

The end follower plates B and C are of similar design, each being of rectangular shape, preferably square, as shown, and having laterally projecting corner flanges 28 and 28 at two diagonally opposite corners on the inner side thereof, as shown in Figures 2, 4 and 5. Each flange 28 extends from the corresponding corner of the plate in opposite directions along the adjacent two side edges of the plate to approximately the mid portions of said edges, said two edge portions of the plate beyond said flanges being open and unobstructed to accommodate the flanges of the adjacent spacing plate D, as hereinafter pointed out. The end follower plates B and C are reversely arranged, that is, with the flanges on the inner sides thereof, as shown in Figures 1 and 2, these follower plates being positioned so that the flanges thereof alternate.

The spacing follower plates D are all of the same design, each plate being substantially square and having two diagonally opposite corner flanges 29—29 on one side and two corner flanges 30—30 on the opposite side thereof. The flanges 29—29 and 30—30 are similar to the flanges 28—28 of the follower plates B and C hereinbefore described. The flanges 29—29 of each plate D are at two diagonally opposite corners of said plate and the flanges 30—30 at the opposite side thereof are at the remaining two diagonal corners of the same, that is, the flanges at one side of each plate D are alternated with the flanges at the opposite side.

In the assembled condition of the mechanism, as shown in Figures 1 and 2, the end followers B and C and the spacing follower plates D—D—D—D—D are arranged so that the flanges 29—29 and 30—30 of the series of adjacent follower plates D—D are interspaced with respect to each other, that the flanges 28—28 of the end follower plate B are interspaced with the flanges 29—29 of the adjacent spacing follower plate D, and the flanges 28—28 of the end follower plate C are interspaced with the flanges 30—30 of the adjacent spacing follower plate D. The flanges 28, 29, and 30 of the end follower plates B and C and the spacing follower plates D—D—D—D—D project such a distance from their respective plates that they extend past each other in overlapping relation and overhang the corresponding group of units A—A to a point considerably beyond the division line between said units. When assembled with the railroad car, my improved mechanism is snugly embraced between the guide walls formed by the movable sills 14—14, the wear plate 19 of the floor structure 12, and the supporting plate 13 so that the follower plates B and C and the spacing follower plates D—D have a sliding fit with these parts and are guided by their peripheral flanges, the flanges holding the end follower plates and spacing follower plates of the column against edgewise displacement with respect to each other, and the column of units A against buckling or relative displacement in edgewise direction with respect to each other. In this connection it should be noted that the provision of peripheral flanges of the character illustrated affords extended bearing contact of the flanges with the cooperating guide surfaces for the follower plates, thereby completely eliminating the danger of the plates being tilted during operation of the mechanism in service, which tilting would be detrimental to the proper operation. As installed in the car, the mechanism is under initial compression, being held in that condition between the follower blocks 17 and 18.

In the operation of my improved mechanism, the sills 14—14 are moved lengthwise with respect to the car by shocks transmitted thereto, through the usual coupler, thereby compressing the mechanism between the follower blocks 17 and 18, the follower block at one end of the mechanism being held against movement with respect to the car by the corresponding stop 20, and the follower block at the opposite end of the mechanism being carried toward the same with the sills 14—14, by engagement therewith of the corresponding stop lugs of said sills. During compression of the mechanism, the rubber pads 23 of the units A are flattened out, the material of the pad being squeezed in outward direction between the plates 21 and 22 of each unit, the flow of the material being accommodated in the space provided by the grooved edges of the pad. When the actuating force is reduced, the resilient rubber units A—A expand in direction lengthwise of the mechanism, thus restoring all of the parts to the normal position shown in Figure 1.

I claim:

1. In a shock absorbing mechanism for railway draft rigging, the combination with a structure presenting vertically spaced, top and bottom, longitudinally extending, interior guide walls and laterally spaced, longitudinally extending side guide walls; of a column of cushioning units disposed in the space defined by said walls, said units being divided into groups, each containing a plurality of units, each of said units consisting of a pair of rectangular metal plates disposed at right angles to the axis of the column and a solid mass of rubber disposed between and bonded to said plates; interengaged bosses and sockets on said plates for keeping the units aligned with respect to each other; and means for stabilizing the column under compression comprising: rectangular aligning follower plates alternated with the groups of units; bosses and sockets on said follower plates interengaged with the sockets and bosses of the adjacent units to position the units with respect to the follower plates; and a pair of flanges on each edge of each follower plate disposed normal thereto, one of which flanges extends from one end of the edge into juxtaposition to the center of that edge and upstands from one face of the follower plate, and the other one of which flanges extends from the other end of that edge into juxtaposition to the center of the edge and upstands from the other face of the follower plate, said flanges having sliding engagement with said walls to maintain the follower and unit plates at right angles to said axis, thereby to stabilize the column under compression.

2. A mechanism as specified in claim 1 in which the follower flanges are rectangular in shape and upstand from the face of the follower beyond the adjacent cushioning unit.

3. A mechanism as specified in claim 1 in which the flanges on the follower plates upstand from one face thereof at diagonally opposite corners of the plate and from the other face at the intervening diagonal corners.

4. An aligning follower for stabilizing a resilient column comprising a rectangular metallic plate having centering bosses in one of its faces and centering sockets in the other face; flanges upstanding normally from one face of the plate and extending from diagonally opposite corners thereof along the adjacent edges of the plate into juxtaposition to the centers of those edges; and flanges upstanding normally from the other face of the plate and extending from the intervening diagonally opposite corners of the plate along the adjacent edges of the plate into juxtaposition to the centers of those edges, the second named flanges upstanding from the plate for the same distance as the first named flanges.

References Cited in the file of this patent

UNITED STATES PATENTS

| | | |
|---|---|---|
| 1,897,288 | Whitmore | Feb. 14, 1933 |
| 2,039,268 | Barrows | Apr. 28, 1936 |
| 2,330,706 | Hankins et al. | Sept. 28, 1943 |
| 2,354,458 | Hammerstrom | July 25, 1944 |
| 2,656,182 | Willison | Oct. 20, 1953 |
| 2,686,667 | Willison et al. | Aug. 17, 1954 |